J. H. McCORMICK.
COTTON SEED DELINTING DRUM.
APPLICATION FILED NOV. 2, 1911.
1,038,927.
Patented Sept. 17, 1912.
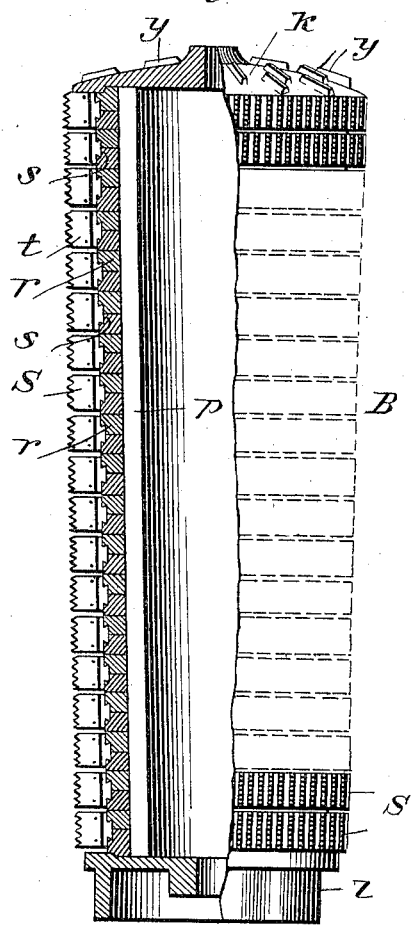
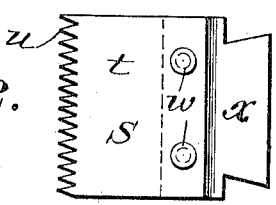

UNITED STATES PATENT OFFICE.

JOHN HOWARD McCORMICK, OF NEW ORLEANS, LOUISIANA.

COTTON-SEED-DELINTING DRUM.

1,038,927. Specification of Letters Patent. Patented Sept. 17, 1912.

Application filed November 2, 1911. Serial No. 658,244.

*To all whom it may concern:*

Be it known that I, JOHN HOWARD MC-CORMICK, citizen of the United States, residing at New Orleans, in the parish of Orleans and State of Louisiana, have invented new and useful Improvements in Cotton-Seed-Delinting Drums, of which the following is a specification.

My present invention has to do with drums for use in cotton seed delinters of the type disclosed in my contemporary application filed February 28, 1911, Serial Number 611,382, of which this application is a division, as well as for use in cotton seed delinters of other descriptions; and it consists in the peculiar and advantageous drum hereinafter described and definitely claimed.

In the accompanying drawings which are hereby made a part hereof: Figure 1 is a detail view, partly in elevation and partly in vertical section and dotted lines of a delinter drum constructed in accordance with my invention. Fig. 2 is an enlarged side elevation, and Fig. 3 a top view illustrative of one of the pairs of steel blades comprised in the drum, and the interposed flexible body, preferably of leather, by which the blades are carried and through the medium of which the blades are connected to the drum.

Similar letters designate corresponding parts in all of the views of the drawings, referring to which:

B is my novel rotary brush drum for use in cotton seed delinters.

The drum B is tapered or gradually reduced in diameter downward, and, as shown in Fig. 1, it comprises an upper head $k$, a lower head $l$, staves $p$, preferably of wood, extending between and fixed to the heads $k$ and $l$, segments $r$, preferably of wood, arranged one above the other and surrounding and attached to the staves $p$ and having undercut grooves $s$ in their outer sides so that the grooves of each segment with that of one adjoining segment forms a circumferential groove of dovetail form in cross-section, Fig. 1, and brushes S. The said brushes are identical in construction and therefore a detailed description of the one shown in Figs. 2 and 3 will suffice to impart a definite understanding of all. By reference to said figures it will be seen that the brush mentioned comprises blades $t$, of steel, having saw-teeth $u$ at their outer ends, and a flexible body $v$, of leather, interposed between the blades $t$ and connected thereto by copper rivets $w$ and having a rear dovetail-shaped extension $x$; the purpose in so attaching the steel blades to the leather body being to prevent crystallization taking place on the blades, and the leather body being also designed to render the connection of the blades to the drum more or less flexible, and in that way increase the efficiency of the blades.

The brushes S are arranged in upright position and in horizontal series on the drum, and by reference to Fig. 1 it will be manifest that a number of horizontal series of brushes, one above the other on the drum, are employed; also, that the brushes of each series are arranged side by side with the dovetail portions of their bodies secured in the dovetail grooves of the drum. It will be understood in this connection that while the leather bodies $v$ are more or less flexible, as before stated, their extensions $x$ are sufficiently stiff and strong to preclude pulling of said extensions out of the dovetail grooves of the drum.

It will be readily understood that a drum comprising the staves $p$, segments $r$ and brushes S may be expeditiously and easily built, and that the drum as a whole is strong and durable and is highly efficient in removing lint from the cotton seed. I would also have it here understood that the head $k$ of the brush drum is convex at its upper side and is provided on said side with projections $y$ which have for their office to scatter the seed received thereon and cause such seed to fall back, after the manner of rain, on the said convex side, after which the seed is again scattered and caused to pass singly down the convex side of the head to the upper end of the space surrounding the drum B.

Having described my invention, what I claim and desire to secure by Letters-Patent, is:

1. As a new article of manufacture, a brush for use on delinter drums, comprising blades of thin steel, and a body interposed between and fixed to the blades and having a portion flexible in the direction of its thickness and extending inward beyond the blades and adapted to effect flexible connection of the blades to a drum; said portion being of dovetail shape.

2. As a new article of manufacture, a brush for use on delinter drums, comprising blades of thin steel, and a body interposed between and fixed to the blades and having a portion flexible in the direction of its thickness and extending inward beyond the blades.

3. In a cotton seed delinter, a drum comprising a body having circumferential grooves, of dovetail form in vertical section, at its perimeter, in combination with superposed circumferential series of brushes surrounding the body, each brush comprising upright blades of thin steel and an upright body interposed between and fixed to the blades and having a portion flexible horizontally or in the direction of its thickness and extending inward beyond the blades and provided with a dovetail extension disposed in a groove of the drum body.

4. In a cotton seed delinter, a brush drum comprising upright staves, segments surrounding and fixed to the staves, each pair of segments having in opposed sides grooves which together form a single groove of dovetail form in vertical section, and superposed circumferential series of brushes surrounding the body; each brush comprising upright blades of thin steel and an upright body interposed between and fixed to the blades and having a portion flexible horizontally or in the direction of its thickness and extending inward beyond the blades and provided with a dovetail extension disposed in a dovetail groove of the drum body.

In testimony whereof I have hereunto set my hand in presence of two subscribing witnesses.

JOHN HOWARD McCORMICK.

Witnesses:
R. W. GILES,
CHAS. T. DUCHAMP.

---

Copies of this patent may be obtained for five cents each, by addressing the "Commissioner of Patents, Washington, D. C."